United States Patent
McMillen et al.

(10) Patent No.: US 9,721,553 B2
(45) Date of Patent: Aug. 1, 2017

(54) SENSOR-BASED PERCUSSION DEVICE

(71) Applicant: Kesumo, LLC, Berkeley, CA (US)

(72) Inventors: Keith A. McMillen, Berkeley, CA (US); Maxime Stinnett, Oakland, CA (US); Brent Allen, Ross, CA (US); Gregory Wille, Berkeley, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 0 days.

(21) Appl. No.: 15/287,520

(22) Filed: Oct. 6, 2016

(65) Prior Publication Data

US 2017/0110103 A1    Apr. 20, 2017

Related U.S. Application Data (60) Provisional application No. 62/241,615, filed on Oct. 14, 2015.

(51) Int. Cl.
| | |
|---|---|
| *G10H 1/22* | (2006.01) |
| *G10H 7/00* | (2006.01) |
| *G10H 3/14* | (2006.01) |
| *G01L 1/18* | (2006.01) |
| *G01L 5/00* | (2006.01) |

(52) U.S. Cl.
CPC ............... *G10H 3/146* (2013.01); *G01L 1/18* (2013.01); *G01L 5/0052* (2013.01); *G10H 1/22* (2013.01); *G10H 3/143* (2013.01); *G10H 2220/161* (2013.01); *G10H 2220/561* (2013.01); *G10H 2220/565* (2013.01)

(58) Field of Classification Search
CPC .......... G10H 3/146; G10H 1/22; G10H 3/143; G10H 2220/161; G10H 2220/561; G10H 2220/565; G01L 1/18; G01L 5/0052
USPC .......................................................... 84/618
See application file for complete search history.

(56) References Cited

U.S. PATENT DOCUMENTS

| | | |
|---|---|---|
| 4,294,014 A | 10/1981 | Baumann et al. |
| 4,438,291 A | 3/1984 | Eichelberger et al. |
| 4,852,443 A * | 8/1989 | Duncan ............... G10H 1/0551 200/600 |
| 5,033,291 A | 7/1991 | Podoloff et al. |
| 5,128,880 A | 7/1992 | White |
| 5,131,306 A | 7/1992 | Yamamoto |
| 5,237,520 A | 8/1993 | White |
| 5,288,938 A | 2/1994 | Wheaton |
| 5,429,092 A | 7/1995 | Kamei |
| 5,571,973 A | 11/1996 | Taylot |
| 5,578,766 A | 11/1996 | Kondo |
| 5,659,395 A | 8/1997 | Brown et al. |

(Continued)

FOREIGN PATENT DOCUMENTS

| | | |
|---|---|---|
| CN | 201920728 U | 8/2011 |
| CN | 102551728 A | 7/2012 |

(Continued)

OTHER PUBLICATIONS

U.S. Appl. No. 15/251,772, filed Aug. 30, 2016, McMillen.

(Continued)

*Primary Examiner* — Jeffrey Donels
(74) *Attorney, Agent, or Firm* — Weaver Austin Villeneuve & Sampson LLP (57) ABSTRACT

Percussion devices are described employing sensor arrays based on piezoresistive materials.

58 Claims, 9 Drawing Sheets

(56) References Cited

U.S. PATENT DOCUMENTS

| | | | |
|---|---|---|---|
| 5,695,859 A | 12/1997 | Burgess | |
| 5,729,905 A | 3/1998 | Mathiasmeier et al. | |
| 5,822,223 A | 10/1998 | Genest | |
| 5,866,829 A | 2/1999 | Pecoraro | |
| 5,878,359 A | 3/1999 | Takeda | |
| 5,943,044 A | 8/1999 | Martinelli et al. | |
| 5,989,700 A | 11/1999 | Krivopal | |
| 6,029,358 A | 2/2000 | Mathiasmeier et al. | |
| 6,155,120 A | 12/2000 | Taylor | |
| 6,215,055 B1 | 4/2001 | Saravis | |
| 6,216,545 B1 | 4/2001 | Taylor | |
| 6,304,840 B1 | 10/2001 | Vance et al. | |
| 6,331,893 B1 | 12/2001 | Brown et al. | |
| 6,360,615 B1 | 3/2002 | Smela | |
| 6,486,776 B1 | 11/2002 | Pollack et al. | |
| 6,815,602 B2 | 11/2004 | De Franco | |
| 6,822,635 B2 | 11/2004 | Shahoian et al. | |
| 6,829,942 B2 | 12/2004 | Yanai et al. | |
| 6,964,205 B2 | 11/2005 | Papakostas et al. | |
| 7,157,640 B2 | 1/2007 | Baggs | |
| 7,332,670 B2 | 2/2008 | Fujiwara et al. | |
| 7,409,256 B2 | 8/2008 | Lin et al. | |
| 7,493,230 B2 | 2/2009 | Schwartz et al. | |
| 7,536,794 B2 | 5/2009 | Hay et al. | |
| 7,608,776 B2 | 10/2009 | Ludwig | |
| 7,719,007 B2 | 5/2010 | Tompkins et al. | |
| 7,754,956 B2 | 7/2010 | Gain et al. | |
| 7,780,541 B2 | 8/2010 | Bauer | |
| 7,855,718 B2 | 12/2010 | Westerman | |
| 7,928,312 B2 | 4/2011 | Sharma | |
| 7,984,544 B2 | 7/2011 | Rosenberg | |
| 8,117,922 B2 | 2/2012 | Xia et al. | |
| 8,161,826 B1 | 4/2012 | Taylor | |
| 8,274,485 B2 | 9/2012 | Liu et al. | |
| 8,448,530 B2 | 5/2013 | Leuenberger et al. | |
| 8,479,585 B2 | 7/2013 | Shaw-Klein | |
| 8,680,390 B2 | 3/2014 | McMillen et al. | |
| 8,884,913 B2 | 11/2014 | Saynac et al. | |
| 8,904,876 B2 | 12/2014 | Taylor et al. | |
| 8,925,393 B2 | 1/2015 | Cannard et al. | |
| 8,964,205 B2 | 2/2015 | Shimizu | |
| 9,038,482 B2 | 5/2015 | Xia et al. | |
| 9,075,404 B2 | 7/2015 | McMillen et al. | |
| 9,076,419 B2 | 7/2015 | McMillen et al. | |
| 9,271,665 B2 | 3/2016 | Sarrafzadeh et al. | |
| 9,442,614 B2 | 9/2016 | McMillen | |
| 9,546,921 B2 | 1/2017 | McMillen et al. | |
| 2002/0078757 A1 | 6/2002 | Hines et al. | |
| 2004/0031180 A1 | 2/2004 | Ivanov | |
| 2004/0093746 A1 | 5/2004 | Varsallona | |
| 2004/0183648 A1 | 9/2004 | Weber et al. | |
| 2004/0189145 A1 | 9/2004 | Pletner et al. | |
| 2005/0109095 A1 | 5/2005 | Sinnett | |
| 2007/0129776 A1 | 6/2007 | Robins et al. | |
| 2007/0188179 A1 | 8/2007 | Deangelis et al. | |
| 2007/0202765 A1 | 8/2007 | Krans et al. | |
| 2007/0234888 A1 | 10/2007 | Rotolo de Moraes | |
| 2008/0158145 A1 | 7/2008 | Westerman | |
| 2008/0254824 A1 | 10/2008 | Moraes | |
| 2009/0049980 A1 | 2/2009 | Sharma | |
| 2009/0237374 A1 | 9/2009 | Li et al. | |
| 2009/0272197 A1 | 11/2009 | Ridao Granado et al. | |
| 2009/0301190 A1 | 12/2009 | Ross, Jr. et al. | |
| 2010/0134327 A1 | 6/2010 | Dinh et al. | |
| 2010/0149108 A1 | 6/2010 | Hotelling et al. | |
| 2010/0179724 A1 | 7/2010 | Weston | |
| 2010/0274447 A1 | 10/2010 | Stumpf | |
| 2010/0286951 A1 | 11/2010 | Danenberg et al. | |
| 2010/0292945 A1 | 11/2010 | Reynolds et al. | |
| 2010/0315337 A1 | 12/2010 | Ferren et al. | |
| 2011/0088535 A1 | 4/2011 | Zarimis | |
| 2011/0088536 A1 | 4/2011 | McMillen et al. | |
| 2011/0141052 A1 | 6/2011 | Bernstein et al. | |
| 2011/0241850 A1 | 10/2011 | Bosch et al. | |
| 2011/0246028 A1 | 10/2011 | Lisseman et al. | |
| 2011/0260994 A1 | 10/2011 | Saynac et al. | |
| 2011/0271772 A1 | 11/2011 | Parks et al. | |
| 2012/0007831 A1 | 1/2012 | Chang et al. | |
| 2012/0026124 A1 | 2/2012 | Li et al. | |
| 2012/0055257 A1* | 3/2012 | Shaw-Klein | H01L 41/081 73/780 |
| 2012/0143092 A1 | 6/2012 | Xia et al. | |
| 2012/0191554 A1 | 7/2012 | Xia et al. | |
| 2012/0197161 A1 | 8/2012 | Xia et al. | |
| 2012/0198949 A1 | 8/2012 | Xia et al. | |
| 2012/0234105 A1 | 9/2012 | Taylor | |
| 2012/0283979 A1 | 11/2012 | Bruekers et al. | |
| 2012/0296528 A1 | 11/2012 | Wellhoefer et al. | |
| 2012/0297885 A1* | 11/2012 | Hou | G06F 3/0414 73/718 |
| 2012/0323501 A1 | 12/2012 | Sarrafzadeh et al. | |
| 2013/0009905 A1 | 1/2013 | Castillo et al. | |
| 2013/0055482 A1 | 3/2013 | D'Aprile et al. | |
| 2013/0082970 A1 | 4/2013 | Frey et al. | |
| 2013/0085394 A1 | 4/2013 | Corbett, III et al. | |
| 2013/0113057 A1 | 5/2013 | Taylor | |
| 2013/0192071 A1 | 8/2013 | Esposito et al. | |
| 2013/0211208 A1 | 8/2013 | Varadan et al. | |
| 2013/0239787 A1* | 9/2013 | McMillen | G10H 1/02 84/643 |
| 2013/0274985 A1 | 10/2013 | Lee et al. | |
| 2013/0275057 A1 | 10/2013 | Perlin et al. | |
| 2013/0327560 A1 | 12/2013 | Ichiki | |
| 2014/0007704 A1 | 1/2014 | Granado et al. | |
| 2014/0033829 A1 | 2/2014 | Xia et al. | |
| 2014/0090488 A1* | 4/2014 | Taylor | G01L 1/18 73/862.625 |
| 2014/0107966 A1 | 4/2014 | Xia et al. | |
| 2014/0107967 A1 | 4/2014 | Xia et al. | |
| 2014/0107968 A1 | 4/2014 | Xia et al. | |
| 2014/0125124 A1 | 5/2014 | Verner | |
| 2014/0130593 A1 | 5/2014 | Ciou et al. | |
| 2014/0150573 A1 | 6/2014 | Cannard et al. | |
| 2014/0182170 A1 | 7/2014 | Wawrousek et al. | |
| 2014/0195023 A1 | 7/2014 | Statham et al. | |
| 2014/0215684 A1 | 8/2014 | Hardy et al. | |
| 2014/0222243 A1 | 8/2014 | McMillen et al. | |
| 2014/0318699 A1 | 10/2014 | Longinotti-Buitoni et al. | |
| 2015/0084873 A1 | 3/2015 | Hagenbuch et al. | |
| 2015/0086955 A1 | 3/2015 | Poniatowski et al. | |
| 2015/0261372 A1 | 9/2015 | McMillen et al. | |
| 2015/0316434 A1 | 11/2015 | McMillen et al. | |
| 2015/0317964 A1 | 11/2015 | McMillen et al. | |
| 2015/0331512 A1 | 11/2015 | McMillen et al. | |
| 2015/0331522 A1 | 11/2015 | McMillen et al. | |
| 2015/0331523 A1 | 11/2015 | McMillen et al. | |
| 2015/0331524 A1 | 11/2015 | McMillen et al. | |
| 2015/0331533 A1 | 11/2015 | McMillen et al. | |
| 2015/0370396 A1 | 12/2015 | Hotelling et al. | |
| 2016/0054798 A1 | 2/2016 | Messingher et al. | |
| 2016/0070347 A1 | 3/2016 | McMillen et al. | |
| 2016/0252412 A1 | 9/2016 | McMillen et al. | |
| 2016/0318356 A1 | 11/2016 | McMillen et al. | |
| 2016/0375910 A1 | 12/2016 | McMillen et al. | |

FOREIGN PATENT DOCUMENTS

| | | |
|---|---|---|
| CN | 202396601 U | 8/2012 |
| CN | 203234132 U | 10/2013 |
| CN | 102406280 B | 3/2014 |
| DE | 11 2010 004 038 T5 | 9/2012 |
| EP | 0 014 022 B1 | 11/1984 |
| EP | 2 682 724 A1 | 1/2014 |
| JP | H08-194481 A | 7/1996 |
| JP | 2000-267664 A | 9/2000 |
| JP | 2008-515008 A | 5/2008 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| WO | WO 99/20179 A1 | 4/1999 |
| WO | WO 2007/024875 A2 | 3/2007 |

(56) References Cited

FOREIGN PATENT DOCUMENTS

| WO | CN 200980381 Y | 11/2007 |
|---|---|---|
| WO | WO 2009/155891 A1 | 12/2009 |
| WO | WO 2011/047171 A2 | 4/2011 |
| WO | WO 2015/175317 A1 | 11/2015 |
| WO | WO 2016/070078 A1 | 5/2016 |
| WO | WO 2016/138234 A1 | 9/2016 |
| WO | PCT/US16/55997 | 10/2016 |
| WO | WO 2016/176307 A1 | 11/2016 |
| WO | WO 2016/210173 A1 | 12/2016 |

OTHER PUBLICATIONS

U.S. Appl. No. 15/374,816, filed Dec. 9, 2016, McMillen et al.
U.S. Office Action dated Sep. 12, 2012 issued in U.S. Appl. No. 12/904,657.
U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Notice of Allowance dated May 1, 2015 issued in U.S. Appl. No. 14/173,617.
U.S. Office Action dated Mar. 10, 2016 issued in U.S. Appl. No. 14/727,619.
U.S. Final Office Action dated Jul. 18, 2016 issued in U.S. Appl. No. 14/727,619.
U.S. Notice of Allowance dated Sep. 15, 2016 issued in U.S. Appl. No. 14/727,619.
U.S. Office Action dated Apr. 2, 2015 issued in U.S. Appl. No. 13/799,304.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Final Office Action dated Mar. 9, 2016 issued in U.S. Appl. No. 14/728,872.
U.S. Office Action dated Jun. 22, 2016 issued in U.S. Appl. No. 14/728,872.
U.S. Final Office Action dated Oct. 18, 2016 issued in U.S. Appl. No. 14/728,872.
U.S. Office Action dated Jul. 25, 2016 issued in U.S. Appl. No. 14/728,873.
U.S. Office Action dated Dec. 30, 2016 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Office Action dated Jan. 13, 2016 issued in U.S. Appl. No. 14/464,551.
U.S. Notice of Allowance dated Jun. 23, 2016 issued in U.S. Appl. No. 14/464,551.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S. Office Action dated May 20, 2016 issued in U.S. Appl. No. 14/928,058.
U.S. Final Office Action dated Jan. 6, 2017 issued in U.S. Appl. No. 14/928,058.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Search Report and Written Opinion dated Apr. 14, 2016 issued in PCT/US2015/058370.
PCT International Search Report and Written Opinion dated Sep. 15, 2016 issued in PCT/US2016/029528.
PCT International Search Report and Written Opinion dated Sep. 29, 2016 issued in PCT/US2016/039089.
"Electronic Foot Size Measuring Devices," *Sensatech Research Ltd., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (© 2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.
"The Emed®-Systems," [retrieved at http://www.novel.de/novelcontent/emed on Sep. 17, 2015] *novel.de*, 4 pages.

\* cited by examiner

FIG. 9

SENSOR-BASED PERCUSSION DEVICE

RELATED APPLICATION DATA

The present application is a non-provisional and claims priority under 35 U.S.C. 119(e) to U.S. Provisional Patent Application No. 62/241,615 entitled Percussion Instrument filed on Oct. 14, 2015, the entire disclosure of which is incorporated herein by reference for all purposes.

SUMMARY

According to a particular class of implementations, a percussion device includes a dielectric substrate having an array of conductive traces formed on a first surface of the dielectric substrate. A piezoresistive substrate is aligned with the dielectric substrate and in contact with the first surface of the dielectric substrate and the conductive traces. The conductive traces and the piezoresistive substrate form a plurality of sensor regions of the percussion device. Each of the sensor regions includes a plurality of sensors. Each of the sensors corresponds to a sensor output. Sensor circuitry is configured to sequentially drive the sensors, to sequentially sample the sensor outputs, and to detect hit events on a top surface of the percussion device. The sensor circuitry is configured to determine, for each hit event, one of the sensor regions corresponding to the hit event, a location of the hit event relative to the array, and a velocity of the hit event.

According to some implementations, the array of conductive traces is substantially circular, each of the sensor regions corresponds to a quadrant of the array, and the location for each hit event is a radial distance relative to the center of the array. According to a specific implementation, the conductive traces of the array are arranged in concentric circles. First ones of the conductive traces are configured for driving the sensors. Second ones of the conductive traces are configured for sampling the sensor outputs. The first and second conductive traces correspond to alternating ones of the concentric circles. According to a more specific implementation, the first conductive traces associated with each sensor region are discontinuous with the first conductive traces associated with other sensor regions, and the first conductive traces for each sensor region are electrically connected to each other by a radial conductive trace. According to another specific implementation, the second conductive traces are continuous through all of the sensor regions.

According to some implementations, the sensor circuitry is configured to detect a first hit event for a first sensor region based on multiple values of the sensor outputs for the first region. Each of the values corresponds to one of the sensors included in the first sensor region. The sensor circuitry is configured to determine the location of the first hit event by interpolating the values. According to a specific implementation, the sensor circuitry is configured to interpolate the values using a sensor location associated with each of the values and a magnitude of each of the values.

According to some implementations, the sensor circuitry is configured to detect a first hit event for a first sensor region based on multiple values of the sensor outputs for the first region. Each of the values corresponds to one of the sensors included in the first sensor region. The sensor circuitry is configured to determine the velocity of the first hit event based on a first one of the values having a greatest magnitude of the values.

According to some implementations, the sensor circuitry is configured to detect a hit event for a first sensor in a first sensor region by determining that the sensor output for the first sensor exceeds an amplitude threshold for longer than a specified duration.

According to some implementations, the piezoresistive substrate is a piezoresistive fabric.

According to some implementations, the top surface of the percussion device is a silicone substrate in a stack of components including the dielectric substrate and the piezoresistive substrate.

According to some implementations, at least some of the sensor circuitry is included on a circuit board disposed in a notch in the dielectric substrate. Conductors of the circuit board are connected to at least some of the conductive traces on the dielectric substrate.

According to some implementations, the percussion device includes electromagnetic interference (EMI) shielding adjacent a second surface of the dielectric substrate opposite the first surface of the dielectric substrate. According to a specific implementation, the EMI shielding includes a conductive mesh integrated with the second surface of the dielectric substrate.

According to another class of implementations, a percussion device includes a piezoresistive substrate having an array of conductive traces formed thereon. The conductive traces and the piezoresistive substrate form a plurality of sensor regions of the percussion device. Each of the sensor regions includes a plurality of sensors. Each of the sensors corresponds to a sensor output. Sensor circuitry is configured to sequentially drive the sensors, to sequentially sample the sensor outputs, and to detect hit events on a top surface of the percussion device. The sensor circuitry is configured to determine, for each hit event, one of the sensor regions corresponding to the hit event, a location of the hit event relative to the array, and a velocity of the hit event.

According to some implementations, the array of conductive traces is substantially circular, each of the sensor regions corresponds to a quadrant of the array, and the location for each hit event is a radial distance relative to the center of the array. According to a specific implementation, the conductive traces of the array are arranged in concentric circles. First ones of the conductive traces are configured for driving the sensors. Second ones of the conductive traces are configured for sampling the sensor outputs. The first and second conductive traces correspond to alternating ones of the concentric circles. According to a more specific implementation, the first conductive traces associated with each sensor region are discontinuous with the first conductive traces associated with other sensor regions, and the first conductive traces for each sensor region are electrically connected to each other by a radial conductive trace. According to another specific implementation, the second conductive traces are continuous through all of the sensor regions.

According to some implementations, the sensor circuitry is configured to detect a first hit event for a first sensor region based on multiple values of the sensor outputs for the first region. Each of the values corresponds to one of the sensors included in the first sensor region. The sensor circuitry is configured to determine the location of the first hit event by interpolating the values. According to a specific implementation, the sensor circuitry is configured to interpolate the values using a sensor location associated with each of the values and a magnitude of each of the values.

According to some implementations, the sensor circuitry is configured to detect a first hit event for a first sensor region based on multiple values of the sensor outputs for the first region. Each of the values corresponds to one of the sensors included in the first sensor region. The sensor circuitry is configured to determine the velocity of the first hit event based on a first one of the values having a greatest magnitude of the values.

According to some implementations, the sensor circuitry is configured to detect a hit event for a first sensor in a first sensor region by determining that the sensor output for the first sensor exceeds an amplitude threshold for longer than a specified duration.

According to some implementations, the piezoresistive substrate is a piezoresistive fabric.

According to some implementations, the top surface of the percussion device is a silicone substrate in a stack of components including the piezoresistive substrate.

According to some implementations, at least some of the sensor circuitry is included on a circuit board disposed in a notch in the piezoresistive substrate. Conductors of the circuit board are connected to at least some of the conductive traces on the piezoresistive substrate.

According to some implementations, the percussion device includes electromagnetic interference (EMI) shielding. According to a specific implementation, the EMI shielding includes a conductive mesh integrated with a dielectric substrate and electrically isolated from the piezoresistive substrate.

A further understanding of the nature and advantages of various implementations may be realized by reference to the remaining portions of the specification and the drawings.

DETAILED DESCRIPTION

This disclosure describes and enables percussion devices that employ electronic sensor technology. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force (e.g., pressure, impact, distortion, etc.) applied to the material. One class of devices described herein includes conductive traces formed directly on or otherwise integrated with a dielectric substrate with piezoresistive material that is adjacent and/or tightly integrated with the dielectric substrate and in contact with at least some of the traces on the dielectric. Another class of devices described herein includes conductive traces formed directly on or otherwise integrated with a substrate of piezoresistive material, e.g., a piezoresistive fabric. When force is applied to such either type of device, the resistance between traces connected by the piezoresistive material changes in a time-varying manner that is representative of the applied force.

A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable circuitry), and mapped (e.g., by the associated processor, controller, or circuitry, or a separate control system) to a control function that may be used in conjunction with the control and/or operation of virtually any type of process, device, or system. For implementations described herein such control functions include generation of audio representations of percussion instruments.

The piezoresistive material with which the traces are in contact or on which the traces are formed may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the dielectric substrate or the piezoresistive material using any of a variety of conductive inks or paints. More generally, implementations are contemplated in which the conductive traces are formed using any conductive material that may be formed on either type of substrate. It should be understood with reference to the foregoing that, while specific implementations are described with reference to specific materials and techniques, the scope of this disclosure is not so limited.

Both one-sided and two-side implementations are contemplated, e.g., conductive traces can be printed or formed on one or both sides of a substrate. As will be understood, two-sided implementations may require some mechanism for connecting conductive traces on one side of the substrate to those on the other side. Some implementations use vias through which conductive ink or paint is flowed to establish the connections. Alternatively, a wide range of conductive elements may be inserted to make connections through the substrate including, for example, pre-formed conductive vias, rivets, staples, wire, conductive thread, etc. Both single and double-sided implementations may also use insulating materials formed over or under conductive traces. This allows for the stacking or layering of conductive traces and signal lines, e.g., to allow the routing of signal line to isolated structures in a manner analogous to the different layers of a printed circuit board.

Routing of signals on and off the substrate may be achieved in a variety of ways. For example, some implementations might use elastomeric connectors (e.g., ZEBRA® connectors) which alternate conductive and non-conductive rubber at a density typically an order of magnitude greater than the width of the conductive traces to which they connect (e.g., at the edge of the substrate). Alternatively, a circuit board or a bundle of conductors may be riveted or otherwise secured to the substrate. The use of rivets may also provide mechanical reinforcement to the connection.

According to some implementations, matching conductive traces or pads on the substrate and a circuit board can be secured to each other using, for example, a layer of conductive adhesive (e.g., a conductive epoxy such as Masterbond EP79 from Masterbond, Inc. of Hackensack, N.J.) applied to one or both of the surfaces which are then mated to each other. The conductive traces or pads can also be held together with additional mechanical elements such as sonic welds or rivets. If conductive rivets are used to make the electrical connections to the conductive traces of the substrate, the conductive adhesive may not be required. Conductive threads may also be used to connect the conductive traces of the substrate to an external assembly. Other examples of techniques for connecting conductive traces on a substrate to external circuitry are described in U.S. Patent Publication No. 2015/0331533 entitled Flexible Sensors and Applications, the entire disclosure of which is incorporated herein by reference for all purposes. More generally, the wide range of variations within the scope of this disclosure will be apparent to those of skill in the art.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material (which may be, for example, a polyester felt) is selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. In some implementations, the fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphene particles. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of materials that exhibit a change in resistance or conductivity when force is applied to the material may be suitable for implementation of sensors as described herein.

According to a particular class of implementations, conductive traces having varying levels of conductivity are formed on a dielectric substrate or piezoresistive material using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable. The degree of conductivity for different traces and applications may be controlled by the amount or concentration of conductive particles (e.g., silver, copper, aluminum, carbon, etc.) suspended in the silicone. These inks can be screen printed or printed from an inkjet printer. According to some implementations, the substrate on which the inks are printed are non-stretchable allowing for the use of less expensive inks that are low in flexibility and/or stretchability. Another class of implementations uses conductive paints (e.g., carbon particles mixed with paint) such as those that are commonly used for EMI shielding and ESD protection.

Additional examples of sensor technology and related techniques that may be used with various implementations enabled by the present disclosure are described in U.S. Patent Publication No. 2011/0088536 entitled Foot-Operated Controller filed on Oct. 14, 2010, U.S. Patent Publication No. 2013/0239787 entitled Multi-Touch Pad Controller filed on Mar. 13, 2013, U.S. Patent Publication No. 2015/0331522 entitled Piezoresistive Sensors and Applications filed on Jun. 9, 2014, and U.S. Patent Publication No. US 2015/0331523 entitled Two-Dimensional Sensor Arrays filed on Aug. 20, 2014, the entire disclosure of each of which is incorporated herein by reference for all purposes. However, it should also be noted that implementations are contemplated that employ a variety of other suitable sensor technologies. The scope of this disclosure should therefore not be limited by reference to these examples.

Figure 1:
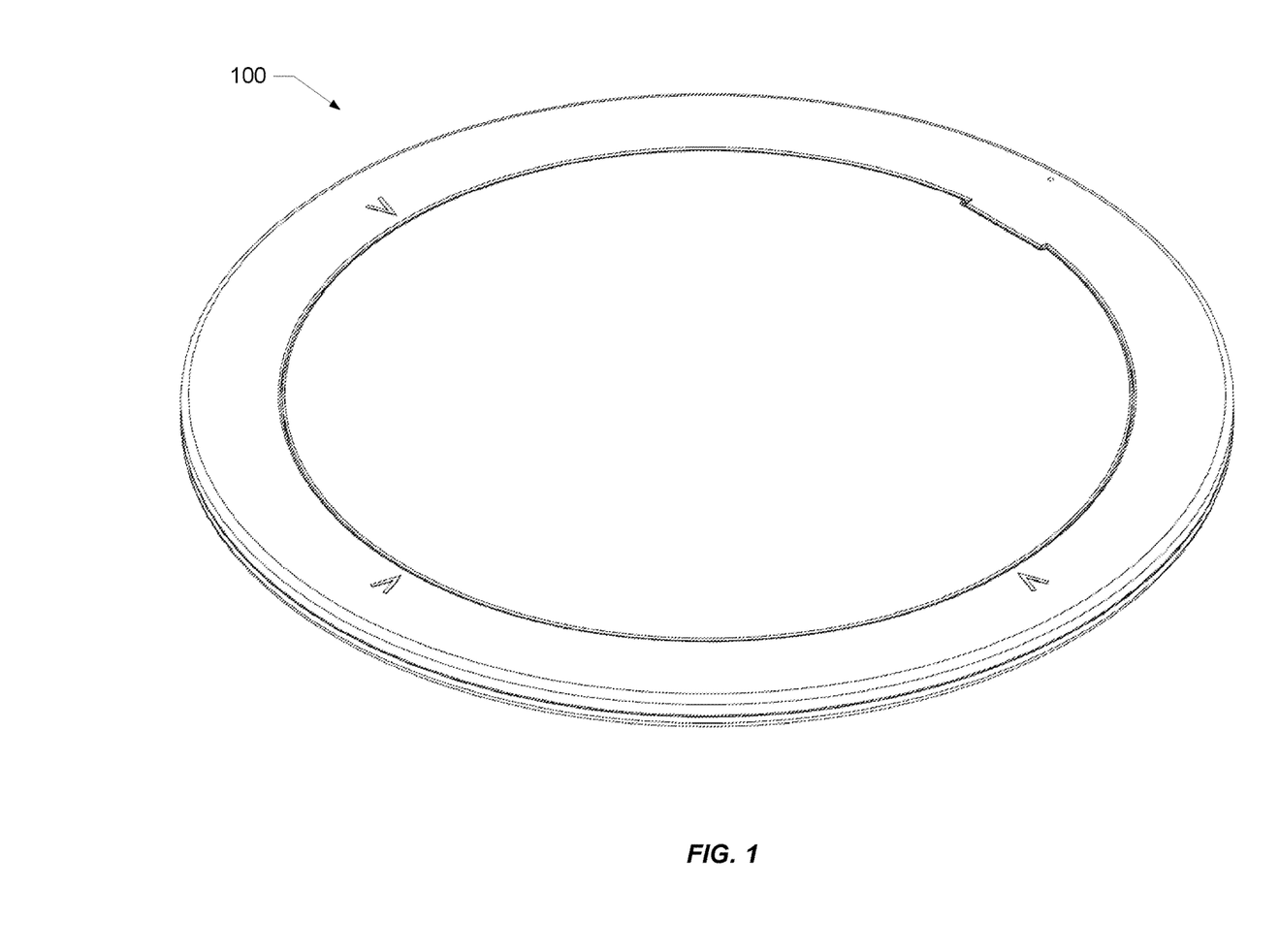
FIG. 1 is a perspective view of a percussion device.

An example of a percussion device 100 is shown in FIG. 1. An exploded view of percussion device 100 is provided in FIG. 2. According to a particular class of implementations, the percussion device has four quadrants. Each quadrant is configured to detect and report hit events, including initial hit velocity (useful in forming a MIDI note). Each quadrant is also configured to detect and report a continuous range of force and a location (e.g., radial distance) of hit events on the top surface of percussion device 100.

Figure 2:
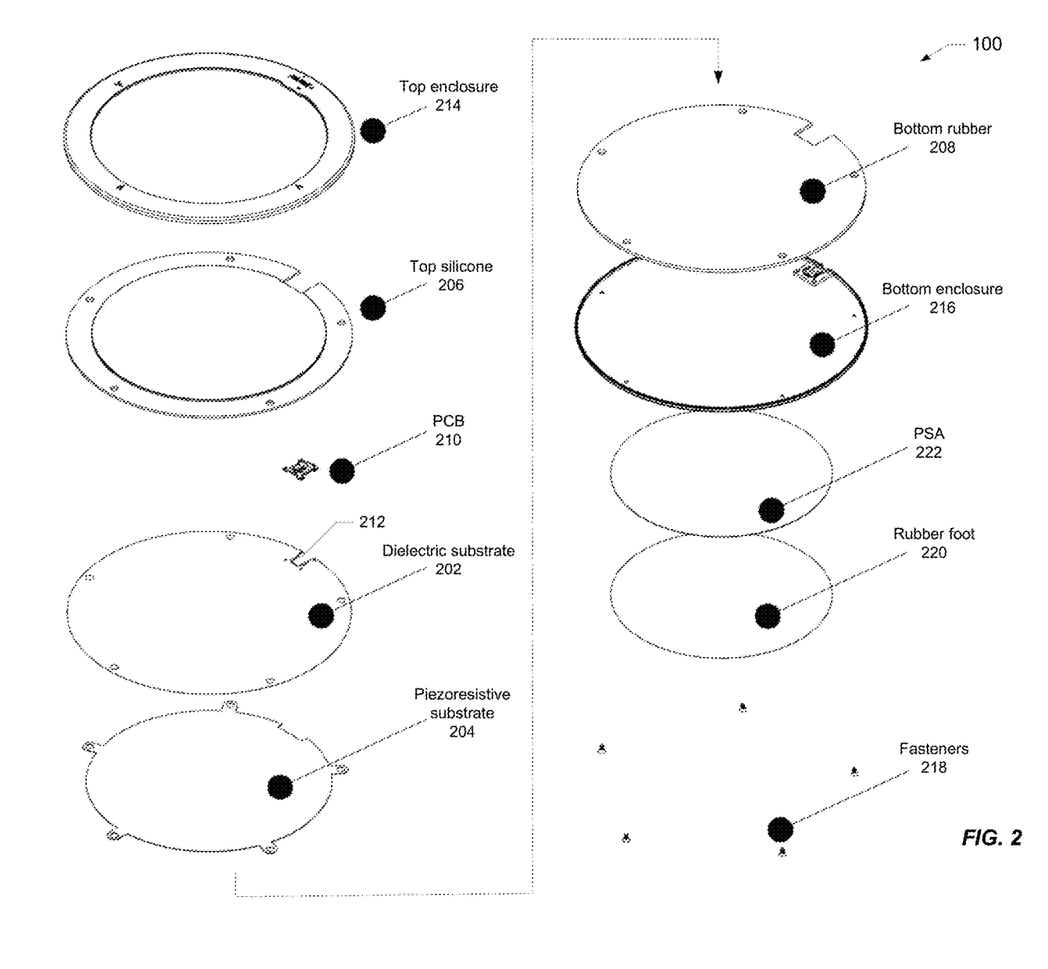
FIG. 2 is an exploded view of a percussion device.
Figure 3:
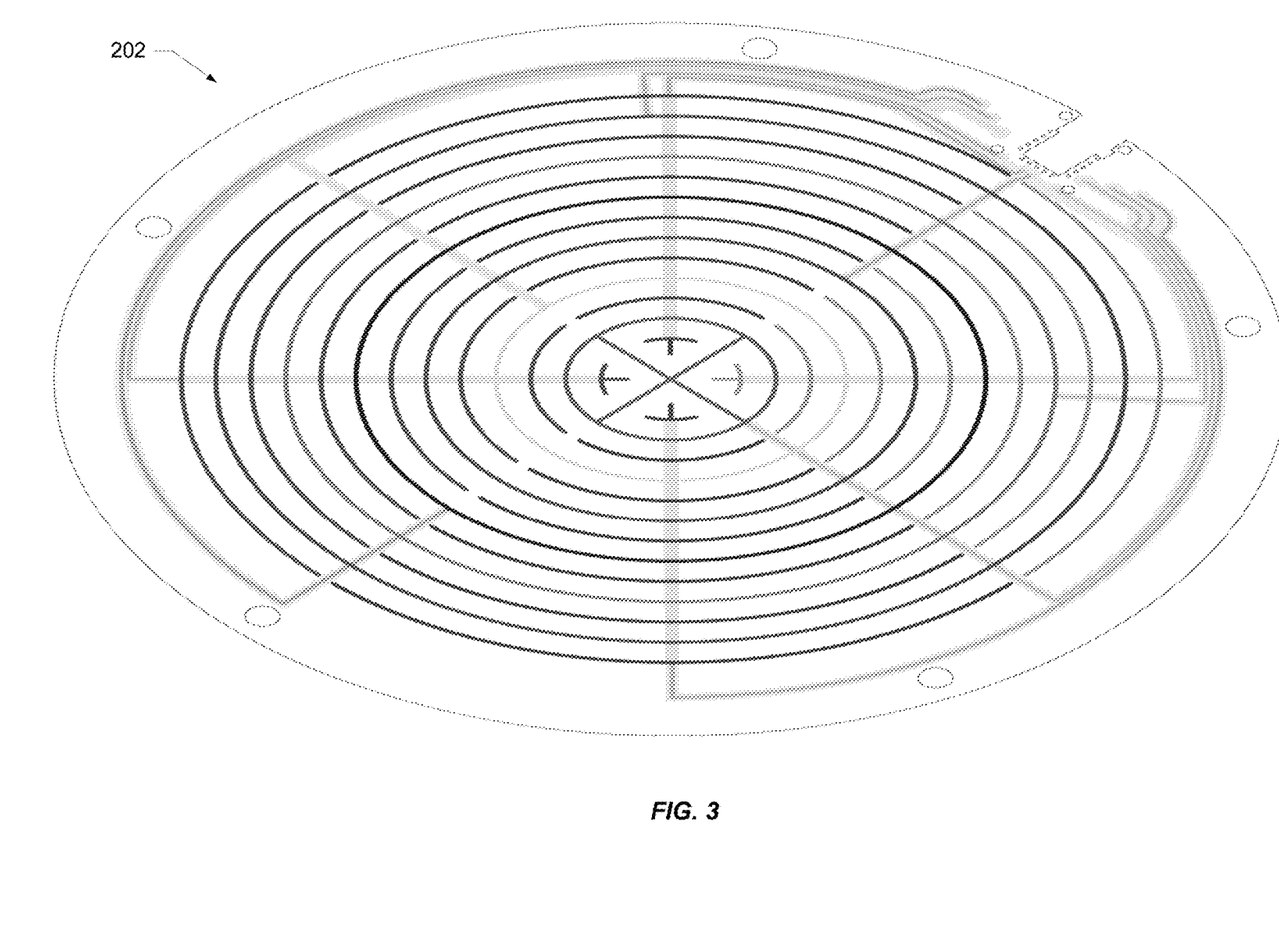
FIG. 3 is an illustration of a circular sensor array for a percussion device.

According to a specific implementation, the quadrants of the percussion device are formed by an array of conductive traces (e.g., screen printed conductive ink or paint) formed directly on or otherwise integrated with a dielectric substrate (e.g., a substrate 202 of polyethylene terephthalate or PET as shown in FIG. 2). An example of such an array is shown in a more detailed illustration of dielectric substrate 202 in FIG. 3. Note that the orientation of dielectric 202 in FIG. 3 is opposite that shown in FIG. 2 in that the sensor traces in FIG. 2 are facing downward toward piezoresistive substrate 204.

Piezoresistive substrate 204 (e.g., piezoresistive fabric) is in contact with at least some of the conductive traces on dielectric substrate 202, i.e., the traces on the side of substrate 202 facing substrate 204 that aren't covered by an insulator. These substrates are secured between layers of silicone rubber 206 and 208 which protect the array and transmit impact energy to dielectric substrate 202 and piezoresistive substrate 204.

For implementations in which the sensor traces are formed on a piezoresistive fabric, the underlying rubber layer may allow the piezoresistive fabric to distend, increasing the area of the fabric affected by the impact. A diffuser layer (e.g., 0.5 mm PET) might also be included to spread the force of an impact event (e.g., a hit of a drum stick) so that a larger area of the underlying fabric sensor array is affected. Either or both of these features may allow for wider spacing of the traces of the sensors and therefore fewer sensor signals to detect and process.

The sensor array is energized and interrogated by analog circuitry and a processor located on a printed circuit board (PCB) 210 that is electrically bonded to the sensor array at notch 212 in dielectric substrate 202. It should again be noted that implementations are contemplated in which the conductive traces are instead formed directly on or otherwise integrated with the piezoresistive substrate. For such implementations, PCB 210 may be electrically bonded to the sensor array in the piezoresistive substrate in a similar manner. In one such implementation, the conductive traces are configured in a manner substantially similar to the array depicted in FIG. 3.

The structure of device 100 is completed by securing top enclosure 214 to bottom enclosure 216 using fasteners 218. Rubber foot 220 is secured to bottom enclosure 216 with an adhesive, e.g., PSA 222.

Figure 4A:
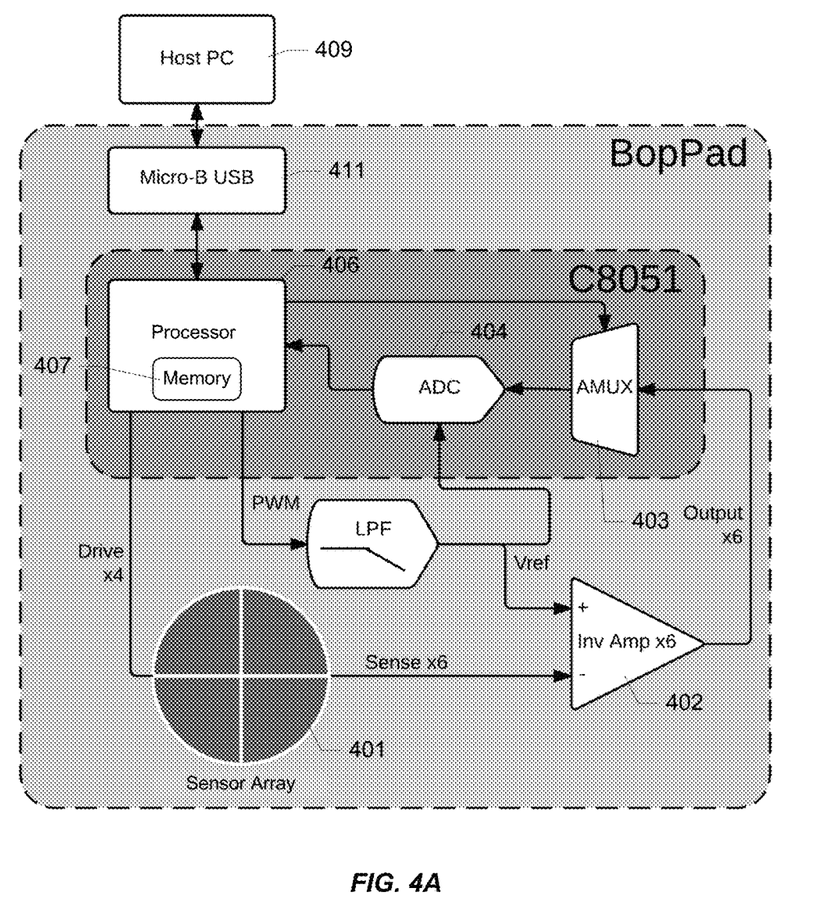
FIGS. 4A and 4B illustrate examples of sensor circuitry for a percussion device.
Figure 4B:
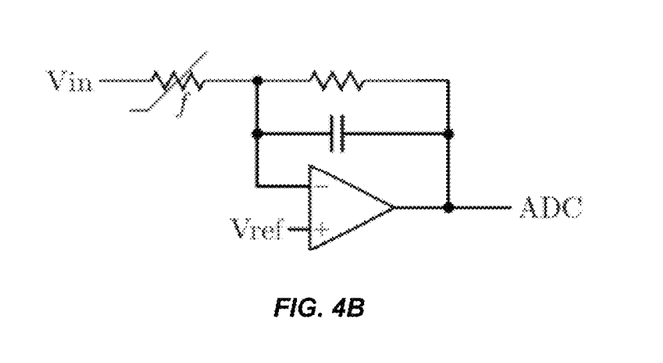

FIGS. 4A and 4B are simplified diagrams of sensor circuitry that may be provided, for example, on PCB 210 or another connected assembly for use with implementations described herein. For example, for the implementation depicted in FIGS. 1-3, such sensor circuitry could be connected to the conductive traces on dielectric substrate 202 (as represented by sensor array 401). When pressure is applied to one of the sensors, a resulting signal (e.g., captured via the corresponding traces) is received (via reference amp 402), multiplexed (via multiplexer 403), and digitized (via A-to-D converter 404) and may be processed locally (e.g., by processor 406) and/or transmitted to a connected system or device (e.g., personal computer 409) via a wired connection (e.g., USB connector 411) or a wireless connection (e.g., a Bluetooth transceiver (not shown), etc.). The sensors of sensor array 401 may be selectively energized by the sensor circuitry (e.g., under the control of a GPIO (General Purpose Input Output) pin of processor 406). Processor 406 may communicate with a remote system via a wired or wireless interface. Power may be provided to the sensor circuitry using any of a variety of mechanisms including one or more batteries. As will be appreciated, the sensor circuitry shown in FIG. 4A is merely an example. A much wider range of sensor circuitry components, configurations, and functionalities are contemplated than depicted. According to a particular implementation, processor 406 may be included in the C8051F380-GM controller (provided by Silicon Labs of Austin, Tex.). Memory 407 (which may or may not be included in processor 406) includes non-transitory computer-readable storage media that may be any of a wide variety of types of volatile and non-volatile storage media, and may include computer readable instructions, data structures, program modules, logic, firmware, and/or other data that implement or support the functionalities described herein.

In the depicted implementation, the PWM signal from processor 406 is used for generation of a voltage for Vref that is between 0V and Vdd (the supply voltage of the controller) by varying the duty cycle of the PWM signal. The low-pass filter rejects the high carrier frequency and harmonics of the PWM signal, resulting in a substantially constant voltage for Vref that is proportional to duty cycle.

Vref is also provided to ADC 404 to allow for higher resolution readings of sensor output signals (e.g., in millivolts/count). An ADC count is equal (in mV) to positive Vref minus negative Vref divided by ADC range. In the example of FIG. 4A, positive Vref is the filtered PWM signal, negative Vref is ground, and the ADC range is 1024 counts (10-bit resolution). In the case of Vref=Vdd=3.3V, (3.3V−0V)/1024 counts=3.22 mV/count, whereas in the case of Vref=Vdd/2=1.65V, (1.65V−0V)/1024 counts=1.61 mV/count. Because of the inverting amplifier configuration, the output of the amplifiers will never rise above Vref, only drop below it. This enables zooming in on the voltage range from Vref to ground without the input to the ADC rising above Vref, and beyond the ADC's operating range. Thus, by constraining the ADC input range to match the amplifier's output range, the ADC step size in mV/count can be decreased.

The operation of the sensor array of the percussion device may be understood with reference to the simplified circuit diagram of FIG. 4B in which a programmable voltage is applied (e.g., by processor 406) across a piezoresistive fabric sensor f equal to (Vin−Vref). The current that flows through the fabric sensor is converted to a digital value (e.g., by ADC 404) and captured by the processor. According to a particular implementation, the processor alternately drives 4 different conductive traces and samples 6 different analog channels, thereby addressing 24 sensor regions or locations. These sensor locations are each sampled over one thousand times per second in order to capture information about the percussionist's input and convert that into a standard MIDI over USB output.

As will be understood, the responses of the sensors in arrays enabled by the present disclosure may exhibit variation relative to each other. According to some implementations, calibrated sensor data may be stored (e.g., in memory 407 of processor 406) representing the response of each of the sensors. Such data may be used for ensuring consistency in the way the sensor outputs are processed and/or used to represent applied forces. During calibration, the output of each sensor (e.g., as captured by ADC 404) is measured for a range of known input forces. In this way, a set of data points for each sensor is captured (e.g., in a table in memory 407) associating ADC values with corresponding forces (e.g., weights in grams or kilograms). The data set for each sensor may capture a force value (or an offset value) for every possible value of the ADC output. Alternatively, fewer data points may be captured and the sensor circuitry may use interpolation to derive force values for ADC outputs not represented in the data set.

According to some implementations, shielding from electromagnetic interference (EMI) is provided to prevent stray fields from affecting performance. Such stray fields might be due, for example, to power grid 60-cycle hum, nearby wireless devices, capacitive coupling between the user's hands and the printed traces, etc. The EMI shield could be provided in a number of ways. For example, for implementations in which the sensor traces are formed on piezoresistive fabric, conductive paint (e.g., nickel paint) could be provided on PET sheets above and/or below the piezoresistive fabric. The shielding might be combined with the diffuser layer discussed above (e.g., with the conductive paint on the other side of the diffuser from the fabric).

Figure 5:
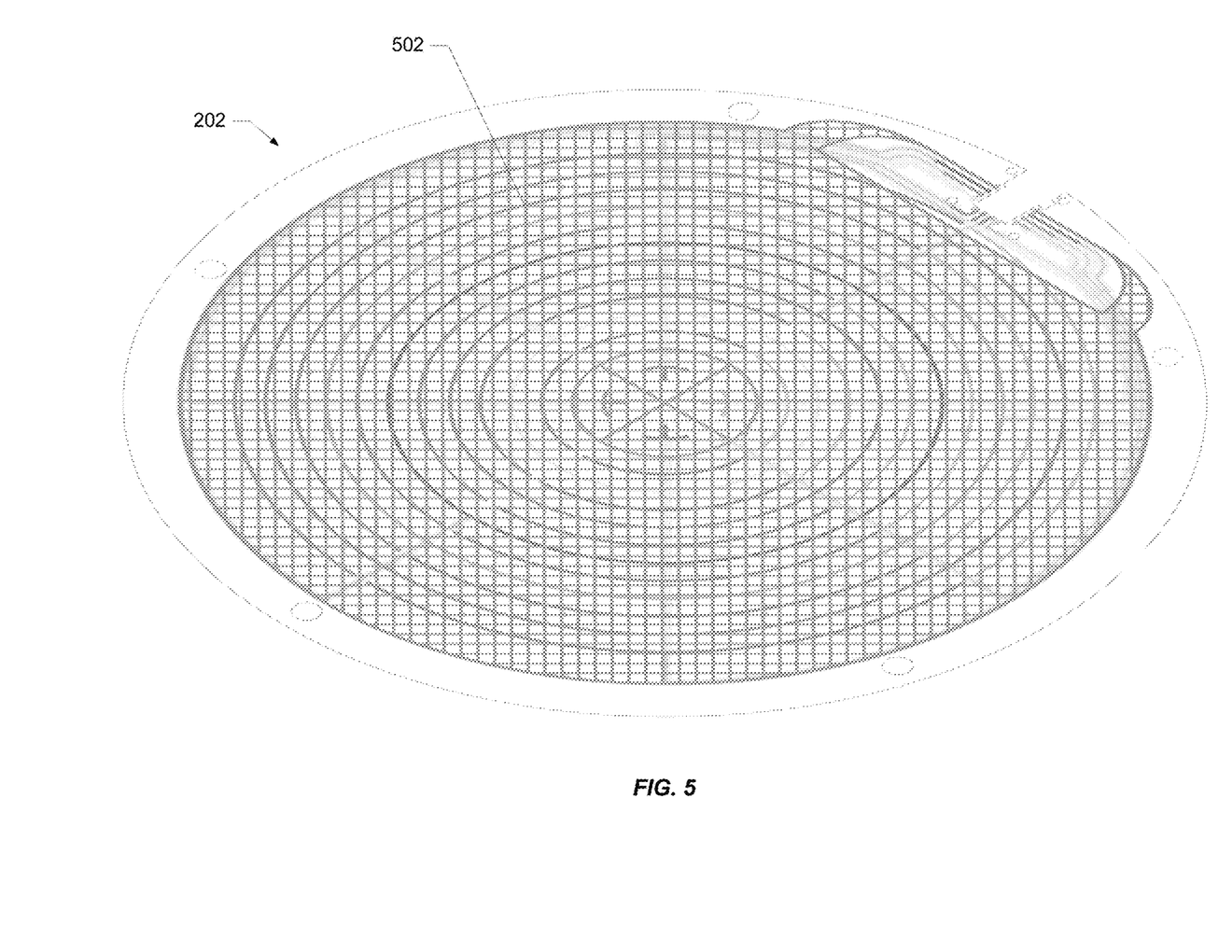
FIG. 5 illustrates EMI shielding for a percussion device.

According to a particular implementation in which the sensor traces are formed on a dielectric substrate, a conductive mesh is provided on the opposite side of the dielectric substrate from the sensor traces. As shown in the example of FIG. 5, crosshatched conductive mesh 502 may be screen printed or otherwise deposited on the top side of dielectric substrate 202. The crosshatched mesh may be electrically connected to ground pads on PCB 210 and/or ground pads on the other side of dielectric substrate 202, e.g., using conductive vias (not shown).

Each quadrant of the percussion device corresponds to one of the four lines being driven by the processor. The configuration of the conductive traces of each quadrant may be understood with reference to FIG. 6 which shows only some of the traces of dielectric substrate 202 for clarity. The solid traces in the upper left hand quadrant are all electrically connected to each other (by radial trace 602) and are the traces by which the quadrant is energized by a drive signal from the processor. Each of the circular traces (dashed lines) represents one of the six independent channels by which the sensors of each quadrant are sampled, i.e., hit events on the quadrant are represented in the signals on these sense traces transmitted as respective sensor outputs to the processor on the PCB (not shown). The portion of each circular sense trace that coincides with a particular quadrant forms a sensor with the adjacent drive traces in that quadrant. According to a particular implementation, the location associated with each such sensor in a quadrant is the radial distance of the corresponding portion of the sense trace relative to the center of the array. Note that the dashed lines representing these drive traces are continuous conductors and that the dashed representation is merely for illustrative purposes.

Figure 6:
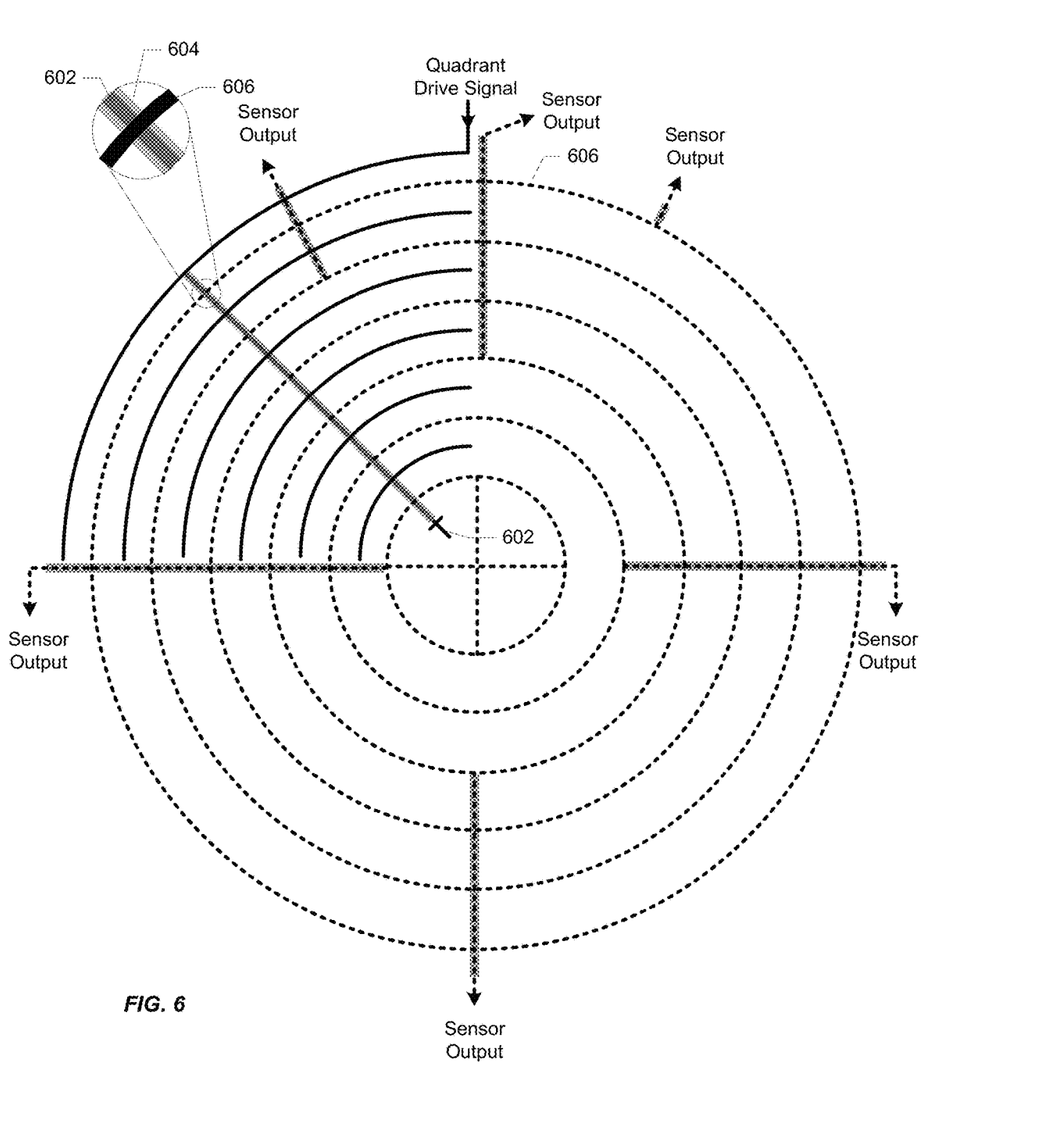
FIG. 6 is an illustration of a portion of circular sensor array for a percussion device.

As shown in FIGS. 3 and 6, the curved drive traces in each quadrant are discontinuous with the drive traces of the other quadrants, ending at the edges of the quadrant while the circular sense traces are continuous through all four quadrants. This is enabled by the use of an insulator 604 over radial trace 602 that allows the sense traces (e.g., sense trace 606) to cross the radial traces in each of the quadrants as shown in the magnified view. Insulator 604 also insulates the radial trace 602 from the piezoresistive substrate. Similar insulators are used in conjunction with the other radial drive traces (not shown) and the radial sense traces by which the sensor outputs are received.

The processor sequentially drives the drive traces and sequentially samples the sense traces to generate a hit event data set. The generation of this data set is done repeatedly. For the depicted implementation, the hit event data set includes a value for each of the 24 combinations of drive traces and sense traces. As will be appreciated, the sequence used to generate the data set may vary for different implementations. For example, the sequence can be organized by sense trace or by drive trace. As will also be appreciated, sequential drive and sampling allows for detection of the location of hit events within a quadrant in terms of the radial distance from the center or edge of the device.

According to a particular class of implementations, hit detection is performed by comparing ADC readings to an offset value stored for the corresponding sensor (e.g., in memory 407). As discussed above, this offset is unique to each sensor due to variations in resistance within the piezoresistive material. The offset magnitude is arrived at using an Infinite Impulse Response (IIR) filter. New readings are added to the current offset multiplied by a feedforward coefficient, and then this sum is divided by a feedback coefficient, equal to the feedforward coefficient plus one. This calculation is illustrated below:

$$offset_2 = \frac{(b * offset_1) + raw_2}{a}$$

where $offset_1$ is the previously calculated offset, $raw_2$ is the latest ADC reading, $a$ is the feedback coefficient, $b$ is the feedforward coefficient, and $offset_2$ is the resulting newly calculated offset. The offset for each sensor is repeatedly recalculated and stored (e.g., in memory 407) to account for changes in noise or in the material's resistance due, for example, to environmental effects. In the event that a hit is not recorded this recalculated offset is saved.

According to a particular implementation, a hysteresis scheme is implemented for hit detection because simply reporting high ADC readings might result in false triggers due to individual noise spikes. The scheme employs two thresholds: one for amplitude and one for duration. The amplitude threshold requires the ADC reading for a sensor to be equal to or greater than the offset value plus the threshold. If the magnitude of the ADC reading is great enough, this constitutes a peak and increments a counter that keeps track of the number of adjacent peaks. The duration threshold requires the number of adjacent peaks to be equal to or greater than the threshold. If the number of peaks that occur in a row is great enough, a hit is registered and the processor sets an internal flag in preparation to report this event. Operation of a particular implementation of a hit detection scheme may be understood with reference to the sample waveform of FIG. 7 and the flowchart of FIG. 8 (representing the "hitDetect" algorithm for a particular quadrant).

Figure 7:
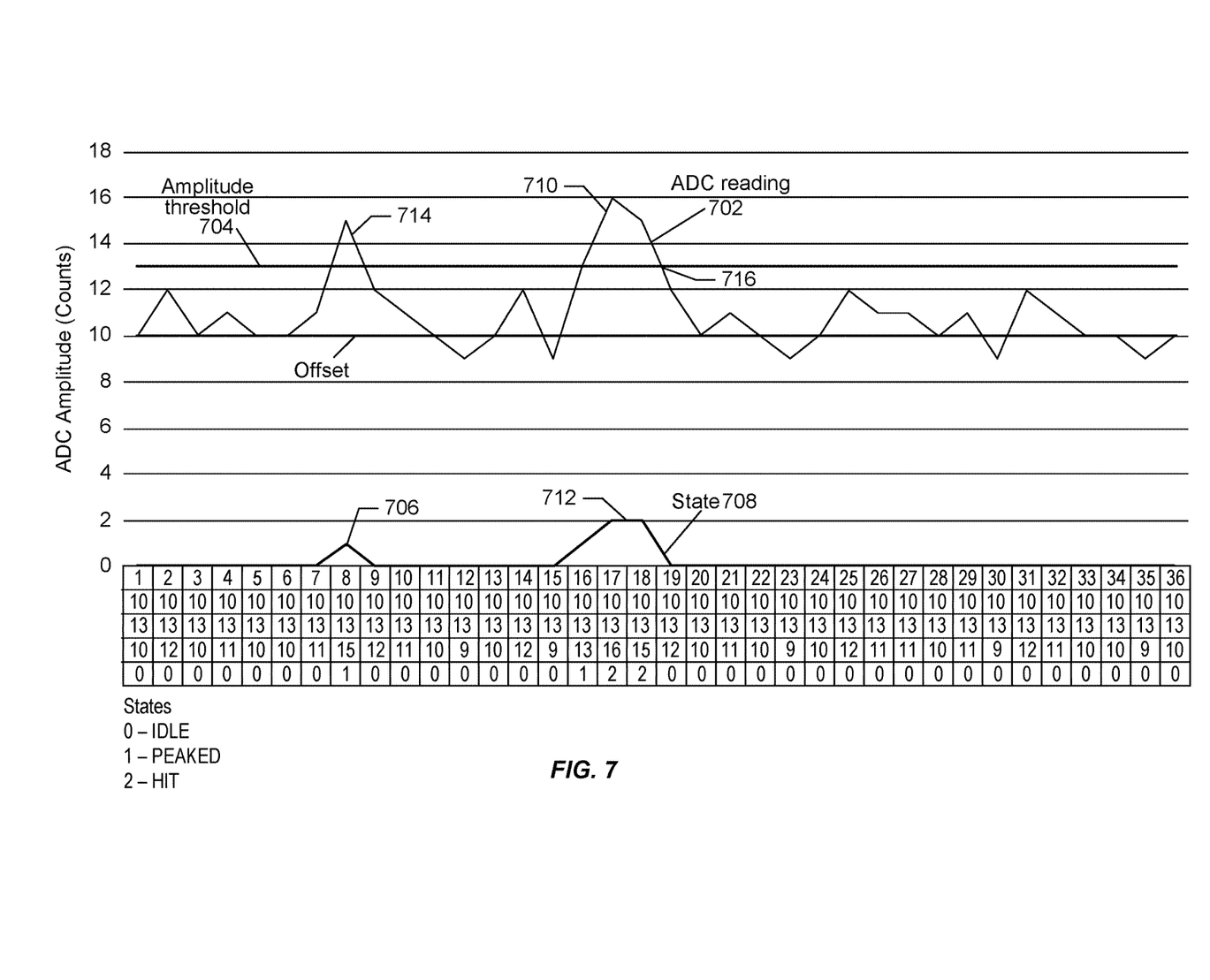
FIG. 7 includes two graphs illustrating detection of hit events on a percussion device.
Figure 8:
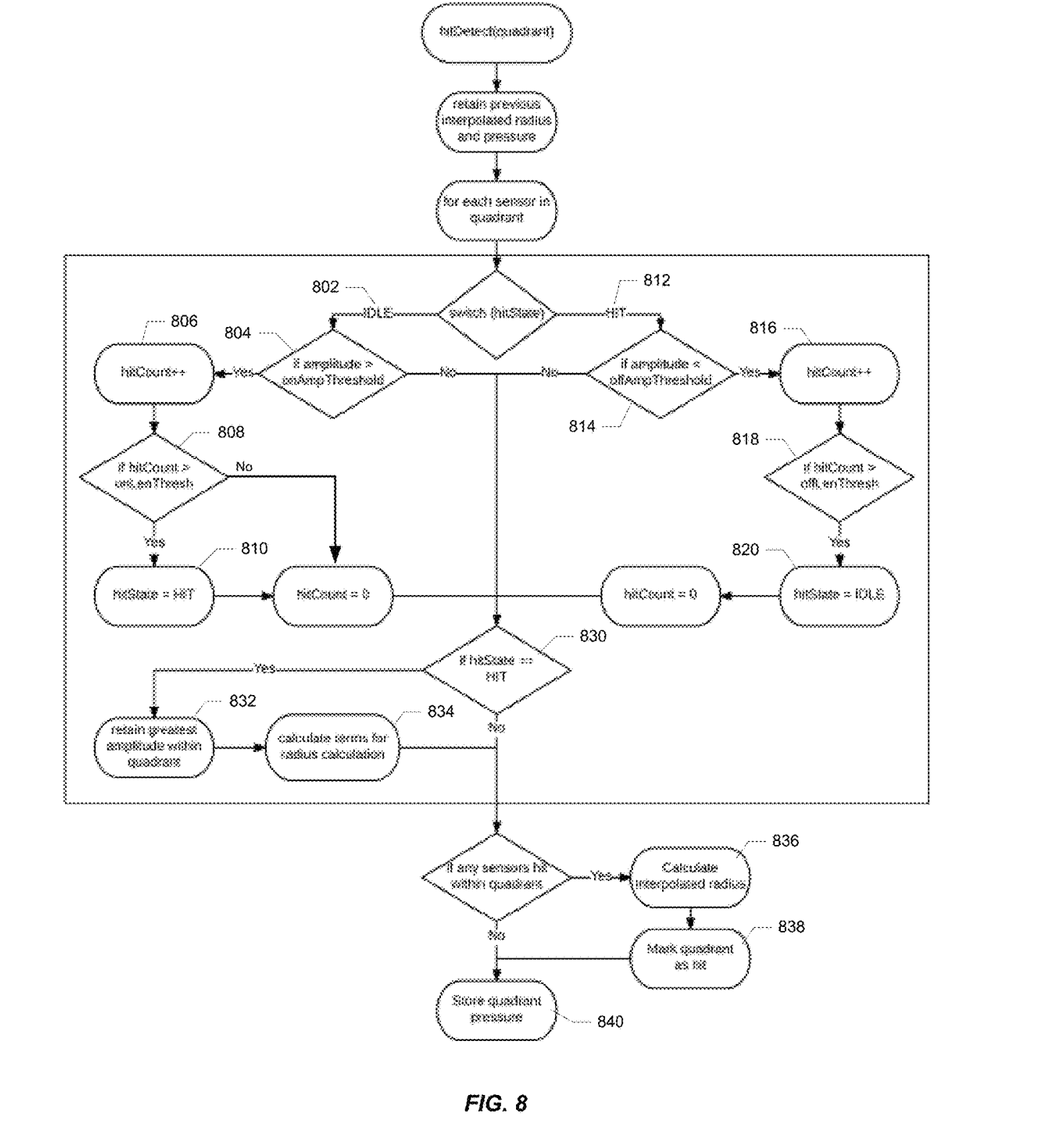
FIG. 8 is a flowchart illustrating hit event detection for a percussion device.

All sensors are initialized to the 'IDLE' state upon startup (802). When a sensor's ADC reading 702 peaks above the on amplitude threshold 704 (804), a counter for that sensor is incremented (806), e.g., as represented by peaked state 706. If this count of contiguous samples above the on amplitude threshold meets the on length threshold (808), e.g., as with peak 710, the state 708 of the sensor will advance to the 'HIT' state of the state machine (810), e.g., 712. This sensor will be marked as hit using a Boolean flag for later use in the 'hitProcess' function. If the sample count does not meet the on length threshold, e.g., as with peak 714, the state of the sensor remains 'IDLE.'

If a sensor in the 'HIT' state (812) drops below the off amplitude threshold (814), e.g., at 716, another counter will increment (816). If this count of contiguous samples below the off amplitude threshold meets the off length threshold (818), the sensor will return to the 'IDLE' state of the state machine (820). The sensor hit flag will be cleared in this event.

The calculation of the quadrant's centroid for radius interpolation occurs within the 'hitDetect' function. If a sensor is hit (830), its amplitude is retained (832) (if it is the greatest of the active sensors in the quadrant), and its radius multiplied by its pressure is added to an accumulator, containing these products for all active sensors within the quadrant (834). After all terms have been accumulated, the sum of products is divided by the sum of pressures to return the interpolated radius (836) and the quadrant is marked as registering a hit (838). The greatest pressure within the quadrant (i.e., the greatest amplitude) is stored as that quadrant's pressure (840).

According to a particular implementation, the interpolated location of the hit is calculated from the velocities of all hit sensors within the quadrant of interest for which hits are reported. In an example in which three sensors (a, b, and c) register a hit within a quadrant, the interpolated location of the hit may be calculated using the following weighted average equation:

$$\frac{(radius_a \times velocity_a) + (radius_b \times velocity_b) + (radius_c \times velocity_c)}{velocity_a + velocity_b + velocity_c} = radius_x$$

where radius refers to the distance between the sensor and the center of the sensor array (i.e., the radial distance from the center of the array to the particular circular sense line with which the hit is correlated), velocity refers to the magnitude of the ADC reading for the hit above the offset, a, b, and c refer to the sensors for which hits were reported that are used in calculating the location, and x refers to the interpolated location. According to some implementations, the velocity of the impact is taken to be the highest of the velocities. According to other implementations, the velocity of impact may be calculated by a simple average of the velocities.

Figure 9:
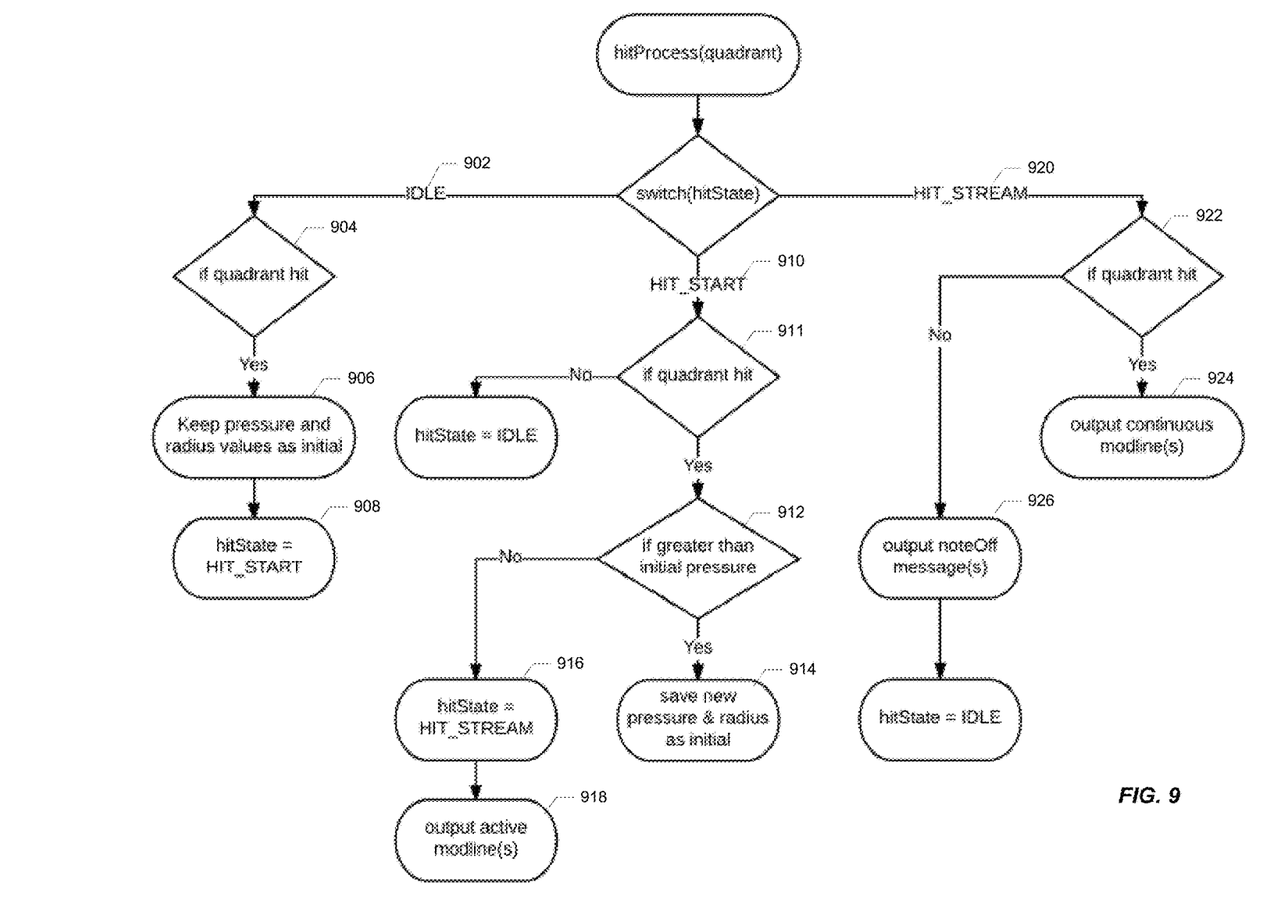
FIG. 9 is a flowchart illustrating hit event processing for a percussion device.

The flowchart of FIG. 9 (representing the "hitProcess" algorithm for a particular quadrant) illustrates the output of modlines via MIDI messages using the quadrant pressure and radius values calculated within the 'hitDetect' function. A "modline" is a set of parameters specified by a user (e.g., in a device configuration user interface) that transform the sensor outputs to desired behaviors. For example, a modline might select an input, apply transformations such as gain (e.g., a multiplier) and offset (e.g., add to or subtract from) to that input, and output the transformed value in a specified message format (e.g., 'MIDI note on' or 'MIDI pitch bend.) A modline might also impose minimum and maximum range limits as well as apply transformations (e.g., linear, log, exp) that change the shape of the response. For example, the user could specify that pressure on a sensor only begins to register at 50% of the sensor's range by specifying an offset of minus 50%. By then specifying a gain factor of 2×, the effective range of the sensor is shifted, e.g., to a more desirable gesture response.

Referring now to FIG. 9, all quadrants are initialized to the 'IDLE' state (902). If the quadrant is designated as hit by a flag (904), it will advance to the 'HIT_START' state (908), with the current pressure and radius values being retained as the initial pressure and initial radius values, respectively (906). If the quadrant is not hit, it will remain in the 'IDLE' state.

In the 'HIT_START' state (910), if the quadrant is still hit (911), and the current pressure value is greater than the previous initial pressure value (912), the new pressure and radius values will be retained as the initial values (914). If the current pressure is less than or equal to the previous initial value, the quadrant will send out all active modlines using the initial pressure and radius values (918) and advance to the 'HIT_STREAM' state (916).

In the 'HIT_STREAM' state (920), if the quadrant is still hit (922), all modlines set to continuous output will be sent out using the current pressure and radius values (924).

If the quadrant is no longer hit when in the 'HIT_START' or 'HIT_STREAM' states, it will return to the 'IDLE' state. If returning from the 'HIT_STREAM' state, in which modline output via MIDI messages occurred, note off messages will be sent for any notes previously turned on (926).

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A percussion device, comprising:
a dielectric substrate having an array of conductive traces formed on a first surface of the dielectric substrate;
a piezoresistive substrate aligned with the dielectric substrate and in contact with the first surface of the dielectric substrate and the conductive traces, wherein the conductive traces and the piezoresistive substrate form a plurality of sensor regions of the percussion device, each of the sensor regions including a plurality of sensors, each of the sensors having a corresponding sensor output; and
sensor circuitry configured to sequentially drive the sensors, to sequentially sample the sensor outputs, and to detect hit events on a top surface of the percussion device, the sensor circuitry being configured to determine, for each hit event, one of the sensor regions corresponding to the hit event, a location of the hit event relative to the array, and a velocity of the hit event, the sensor circuitry also being configured to repeatedly calculate an offset value for each sensor during operation of the percussion device.

2. The percussion device of claim 1, wherein the array of conductive traces is substantially circular, wherein each of the sensor regions corresponds to a quadrant of the array, and wherein the location for each hit event is a radial distance relative to the center of the array.

3. The percussion device of claim 2, wherein the conductive traces of the array are arranged in concentric circles, first ones of the conductive traces being configured for driving the sensors, second ones of the conductive traces being configured for sampling the sensor outputs, the first and second conductive traces corresponding to alternating ones of the concentric circles.

4. The percussion device of claim 3, wherein the first conductive traces associated with each sensor region are discontinuous with the first conductive traces associated with other sensor regions, and wherein the first conductive traces for each sensor region are electrically connected to each other by a radial conductive trace.

5. The percussion device of claim 3, wherein the second conductive traces are continuous through all of the sensor regions.

6. The percussion device of claim 1, wherein the sensor circuitry is configured to detect a first hit event for a first sensor region based on multiple values of the sensor outputs for the first region, each of the values corresponding to one of the sensors included in the first sensor region, the sensor circuitry being further configured to determine the location of the first hit event by interpolating the values.

7. The percussion device of claim 6, wherein the sensor circuitry is configured to interpolate the values using a sensor location associated with each of the values and a magnitude of each of the values.

8. The percussion device of claim 1, wherein the sensor circuitry is configured to detect a first hit event for a first sensor region based on multiple values of the sensor outputs for the first region, each of the values corresponding to one of the sensors included in the first sensor region, the sensor circuitry being further configured to determine the velocity of the first hit event based on a first one of the values having a greatest magnitude of the values.

9. The percussion device of claim 1, wherein the sensor circuitry is configured to detect a hit event for a first sensor in a first sensor region by determining that the sensor output for the first sensor exceeds an amplitude threshold for longer than a specified duration.

10. The percussion device of claim 1, wherein the piezoresistive substrate is a piezoresistive fabric.

11. The percussion device of claim 1, wherein the top surface of the percussion device is a silicone substrate in a stack of components including the dielectric substrate and the piezoresistive substrate.

12. The percussion device of claim 1, wherein at least some of the sensor circuitry is included on a circuit board disposed in a notch in the dielectric substrate, conductors of the circuit board being connected to at least some of the conductive traces on the dielectric substrate.

13. The percussion device of claim 1, further comprising electromagnetic interference (EMI) shielding adjacent a second surface of the dielectric substrate opposite the first surface of the dielectric substrate.

14. The percussion device of claim 13, wherein the EMI shielding comprises a conductive mesh integrated with the second surface of the dielectric substrate.

15. A percussion device, comprising:
a piezoresistive substrate having an array of conductive traces formed thereon, wherein the conductive traces and the piezoresistive substrate form a plurality of sensor regions of the percussion device, each of the sensor regions including a plurality of sensors, each of the sensors having a corresponding sensor output; and
sensor circuitry configured to sequentially drive the sensors, to sequentially sample the sensor outputs, and to detect hit events on a top surface of the percussion device, the sensor circuitry being configured to determine, for each hit event, one of the sensor regions corresponding to the hit event, a location of the hit event relative to the array, and a velocity of the hit event, the sensor circuitry also being configured to repeatedly calculate an offset value for each sensor during operation of the percussion device.

16. The percussion device of claim 15, wherein the array of conductive traces is substantially circular, wherein each of the sensor regions corresponds to a quadrant of the array, and wherein the location for each hit event is a radial distance relative to the center of the array.

17. The percussion device of claim 16, wherein the conductive traces of the array are arranged in concentric circles, first ones of the conductive traces being configured for driving the sensors, second ones of the conductive traces being configured for sampling the sensor outputs, the first and second conductive traces corresponding to alternating ones of the concentric circles.

18. The percussion device of claim 17, wherein the first conductive traces associated with each sensor region are discontinuous with the first conductive traces associated with other sensor regions, and wherein the first conductive traces for each sensor region are electrically connected to each other by a radial conductive trace.

19. The percussion device of claim 17, wherein the second conductive traces are continuous through all of the sensor regions.

20. The percussion device of claim 15, wherein the sensor circuitry is configured to detect a first hit event for a first sensor region based on multiple values of the sensor outputs for the first region, each of the values corresponding to one of the sensors included in the first sensor region, the sensor circuitry being further configured to determine the location of the first hit event by interpolating the values.

21. The percussion device of claim 20, wherein the sensor circuitry is configured to interpolate the values using a sensor location associated with each of the values and a magnitude of each of the values.

22. The percussion device of claim 15, wherein the sensor circuitry is configured to detect a first hit event for a first sensor region based on multiple values of the sensor outputs for the first region, each of the values corresponding to one of the sensors included in the first sensor region, the sensor circuitry being further configured to determine the velocity of the first hit event based on a first one of the values having a greatest magnitude of the values.

23. The percussion device of claim 15, wherein the sensor circuitry is configured to detect a hit event for a first sensor in a first sensor region by determining that the sensor output for the first sensor exceeds an amplitude threshold for longer than a specified duration.

24. The percussion device of claim 15, wherein the piezoresistive substrate is a piezoresistive fabric.

25. The percussion device of claim 15, wherein the top surface of the percussion device is a silicone substrate in a stack of components including the piezoresistive substrate.

26. The percussion device of claim 15, wherein at least some of the sensor circuitry is included on a circuit board disposed in a notch in the piezoresistive substrate, conductors of the circuit board being connected to at least some of the conductive traces on the piezoresistive substrate.

27. The percussion device of claim 15, further comprising electromagnetic interference (EMI) shielding.

28. The percussion device of claim 27, wherein the EMI shielding comprises a conductive mesh integrated with a dielectric substrate and electrically isolated from the piezoresistive substrate.

29. The percussion device of claim 24, further comprising a force diffusing substrate aligned with the piezoresistive substrate, the force diffusing substrate being configured to spread forces associated with the hit events over the piezoresistive substrate.

30. The percussion device of claim 24, further comprising an elastic substrate aligned with the piezoresistive substrate, the elastic substrate being configured to allow the piezoresistive substrate to distend.

31. A percussion device, comprising:
a dielectric substrate having an array of conductive traces formed on a first surface of the dielectric substrate;
a piezoresistive substrate aligned with the dielectric substrate and in contact with the first surface of the dielectric substrate and the conductive traces, wherein the conductive traces and the piezoresistive substrate form a plurality of sensor regions of the percussion device, each of the sensor regions including a plurality of sensors, each of the sensors having a corresponding sensor output; and
sensor circuitry configured to sequentially drive the sensors, to sequentially sample the sensor outputs, and to detect hit events on a top surface of the percussion device, the sensor circuitry being configured to determine, for each hit event, one of the sensor regions corresponding to the hit event, a location of the hit event relative to the array, and a velocity of the hit event, the sensor circuitry also being configured to detect a first hit event for a first sensor in a first sensor region by determining that the sensor output for the first sensor exceeds an amplitude threshold for longer than a specified duration.

32. The percussion device of claim 31, wherein the array of conductive traces is substantially circular, wherein each of the sensor regions corresponds to a quadrant of the array, and wherein the location for each hit event is a radial distance relative to the center of the array.

33. The percussion device of claim 32, wherein the conductive traces of the array are arranged in concentric circles, first ones of the conductive traces being configured for driving the sensors, second ones of the conductive traces being configured for sampling the sensor outputs, the first and second conductive traces corresponding to alternating ones of the concentric circles.

34. The percussion device of claim 33, wherein the first conductive traces associated with each sensor region are discontinuous with the first conductive traces associated with other sensor regions, and wherein the first conductive traces for each sensor region are electrically connected to each other by a radial conductive trace.

35. The percussion device of claim 33, wherein the second conductive traces are continuous through all of the sensor regions.

36. The percussion device of claim 31, wherein the sensor circuitry is configured to detect a first hit event for a first sensor region based on multiple values of the sensor outputs for the first region, each of the values corresponding to one of the sensors included in the first sensor region, the sensor circuitry being further configured to determine the location of the first hit event by interpolating the values.

37. The percussion device of claim 36, wherein the sensor circuitry is configured to interpolate the values using a sensor location associated with each of the values and a magnitude of each of the values.

38. The percussion device of claim 31, wherein the sensor circuitry is configured to detect a first hit event for a first sensor region based on multiple values of the sensor outputs for the first region, each of the values corresponding to one of the sensors included in the first sensor region, the sensor circuitry being further configured to determine the velocity of the first hit event based on a first one of the values having a greatest magnitude of the values.

39. The percussion device of claim 31, wherein the piezoresistive substrate is a piezoresistive fabric.

40. The percussion device of claim 31, wherein the top surface of the percussion device is a silicone substrate in a stack of components including the dielectric substrate and the piezoresistive substrate.

41. The percussion device of claim 31, wherein at least some of the sensor circuitry is included on a circuit board disposed in a notch in the dielectric substrate, conductors of the circuit board being connected to at least some of the conductive traces on the dielectric substrate.

42. The percussion device of claim 31, further comprising electromagnetic interference (EMI) shielding adjacent a second surface of the dielectric substrate opposite the first surface of the dielectric substrate.

43. The percussion device of claim 42, wherein the EMI shielding comprises a conductive mesh integrated with the second surface of the dielectric substrate.

44. A percussion device, comprising:
a piezoresistive substrate having an array of conductive traces formed thereon, wherein the conductive traces and the piezoresistive substrate form a plurality of sensor regions of the percussion device, each of the sensor regions including a plurality of sensors, each of the sensors having a corresponding sensor output; and
sensor circuitry configured to sequentially drive the sensors, to sequentially sample the sensor outputs, and to detect hit events on a top surface of the percussion device, the sensor circuitry being configured to determine, for each hit event, one of the sensor regions corresponding to the hit event, a location of the hit event relative to the array, and a velocity of the hit event, the sensor circuitry also being configured to detect a first hit event for a first sensor in a first sensor region by determining that the sensor output for the first sensor exceeds an amplitude threshold for longer than a specified duration.

45. The percussion device of claim 44, wherein the array of conductive traces is substantially circular, wherein each of the sensor regions corresponds to a quadrant of the array, and wherein the location for each hit event is a radial distance relative to the center of the array.

46. The percussion device of claim 45, wherein the conductive traces of the array are arranged in concentric circles, first ones of the conductive traces being configured for driving the sensors, second ones of the conductive traces being configured for sampling the sensor outputs, the first and second conductive traces corresponding to alternating ones of the concentric circles.

47. The percussion device of claim 46, wherein the first conductive traces associated with each sensor region are discontinuous with the first conductive traces associated with other sensor regions, and wherein the first conductive traces for each sensor region are electrically connected to each other by a radial conductive trace.

48. The percussion device of claim 46, wherein the second conductive traces are continuous through all of the sensor regions.

49. The percussion device of claim 44, wherein the sensor circuitry is configured to detect a first hit event for a first sensor region based on multiple values of the sensor outputs for the first region, each of the values corresponding to one of the sensors included in the first sensor region, the sensor circuitry being further configured to determine the location of the first hit event by interpolating the values.

50. The percussion device of claim 49, wherein the sensor circuitry is configured to interpolate the values using a sensor location associated with each of the values and a magnitude of each of the values.

51. The percussion device of claim 44, wherein the sensor circuitry is configured to detect a first hit event for a first sensor region based on multiple values of the sensor outputs for the first region, each of the values corresponding to one of the sensors included in the first sensor region, the sensor circuitry being further configured to determine the velocity of the first hit event based on a first one of the values having a greatest magnitude of the values.

52. The percussion device of claim 44, wherein the piezoresistive substrate is a piezoresistive fabric.

53. The percussion device of claim 44, wherein the top surface of the percussion device is a silicone substrate in a stack of components including the piezoresistive substrate.

54. The percussion device of claim 44, wherein at least some of the sensor circuitry is included on a circuit board disposed in a notch in the piezoresistive substrate, conductors of the circuit board being connected to at least some of the conductive traces on the piezoresistive substrate.

55. The percussion device of claim 44, further comprising electromagnetic interference (EMI) shielding.

56. The percussion device of claim 55, wherein the EMI shielding comprises a conductive mesh integrated with a dielectric substrate and electrically isolated from the piezoresistive substrate.

57. The percussion device of claim 52, further comprising a force diffusing substrate aligned with the piezoresistive substrate, the force diffusing substrate being configured to spread forces associated with the hit events over the piezoresistive substrate.

58. The percussion device of claim 52, further comprising an elastic substrate aligned with the piezoresistive substrate, the elastic substrate being configured to allow the piezoresistive substrate to distend.

\* \* \* \* \*